(12) United States Patent
Choi et al.

(10) Patent No.: US 8,000,753 B2
(45) Date of Patent: Aug. 16, 2011

(54) APPARATUS AND METHOD FOR PROVIDING HANDS-FREE AND LCD DISPLAY FUNCTION OF MOBILE COMMUNICATION TERMINAL USING ZIGBEE

(75) Inventors: Eun Chang Choi, Daejeon (KR); Jae Doo Huh, Daejeon (KR); Kwang Roh Park, Seoul (KR); Sun Ho Min, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 940 days.

(21) Appl. No.: 11/913,888

(22) PCT Filed: Nov. 8, 2005

(86) PCT No.: PCT/KR2005/003752
§ 371 (c)(1),
(2), (4) Date: Nov. 8, 2007

(87) PCT Pub. No.: WO2007/001109
PCT Pub. Date: Jan. 4, 2007

(65) Prior Publication Data
US 2008/0188181 A1    Aug. 7, 2008

(30) Foreign Application Priority Data
Jun. 29, 2005 (KR) .......... 10-2005-0057090

(51) Int. Cl.
H04M 1/00 (2006.01)
(52) U.S. Cl. .......... 455/569.1; 455/41.2; 455/553.1; 370/254

(58) Field of Classification Search .......... 455/41.2, 455/553.1, 552
See application file for complete search history.

(56) References Cited

FOREIGN PATENT DOCUMENTS

| | | |
|---|---|---|
| DE | 10106072 | 8/2002 |
| EP | 0840465 | 5/1998 |
| EP | 1519522 | 3/2005 |
| KR | 1020020043645 | 6/2002 |
| KR | 1020020046744 | 6/2002 |
| KR | 1020020090488 | 12/2002 |
| KR | 1020050027961 | 3/2005 |
| KR | 1020050029515 | 3/2005 |

OTHER PUBLICATIONS

International Search Report mailed Mar. 20, 2006 for PCT/KR2005/003752.

*Primary Examiner* — Nay Maung
*Assistant Examiner* — Richard Chan
(74) *Attorney, Agent, or Firm* — Lowe Hauptman Ham & Berner LLP

(57) ABSTRACT

The hands-free function provision apparatus for use in the mobile communication terminal using the ZigBee protocol includes: a mobile communication terminal for performing transmission/reception of a voice signal via a base station; a ZigBee coordinator for transmitting or receiving a predetermined display signal and a call control signal for establishing a call connection state to/from the mobile communication terminal, modulating or demodulating the predetermined display signal, the call control signal, and the voice signal using the ZigBee protocol; and a ZigBee device for performing wireless transmission/reception with the ZigBee coordinator by modulating or demodulating the predetermined display signal, the call control signal, and the voice signal using the ZigBee protocol, and visually providing the predetermined display signal.

18 Claims, 5 Drawing Sheets

[Fig. 1]
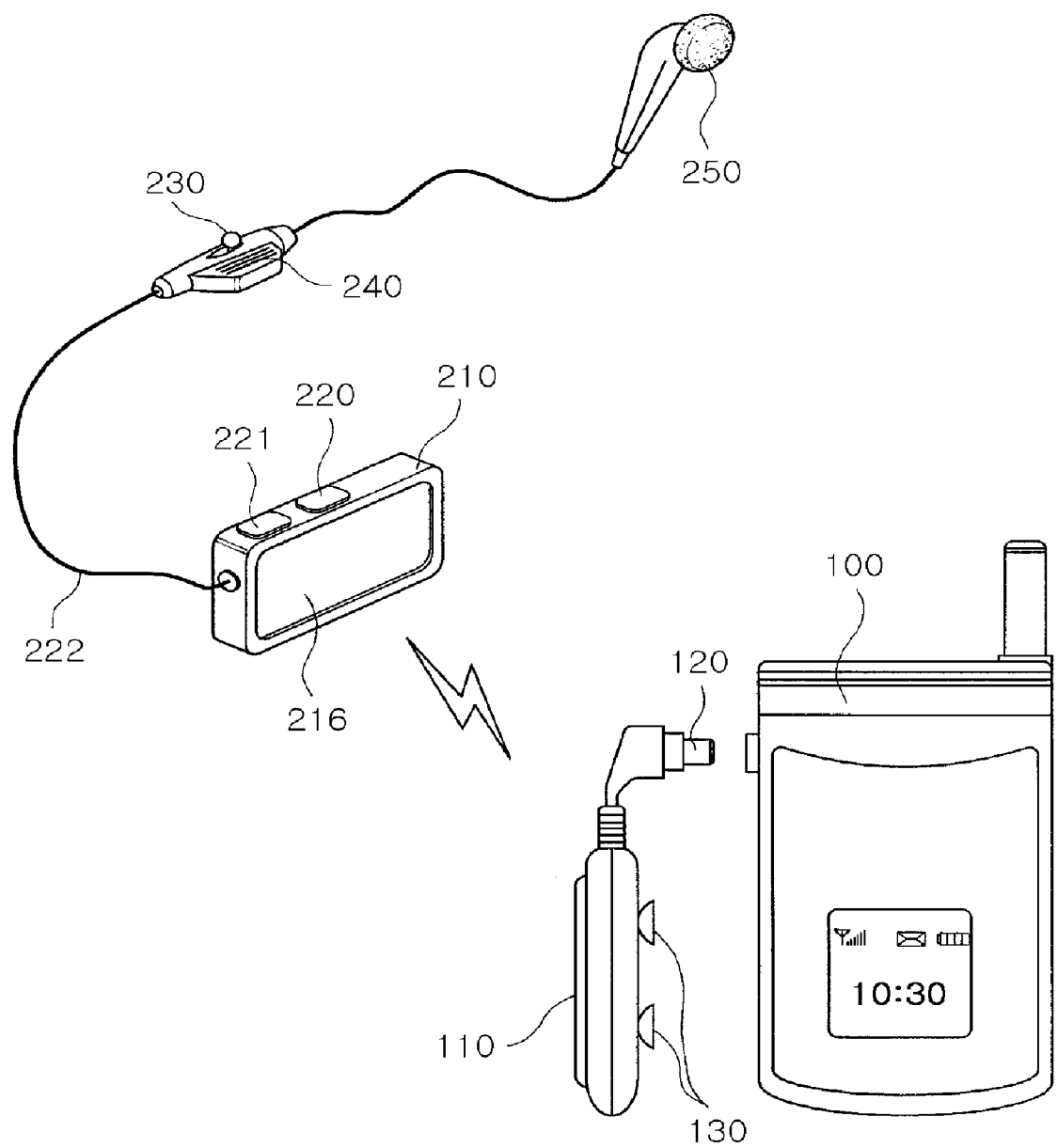

[Fig. 2]
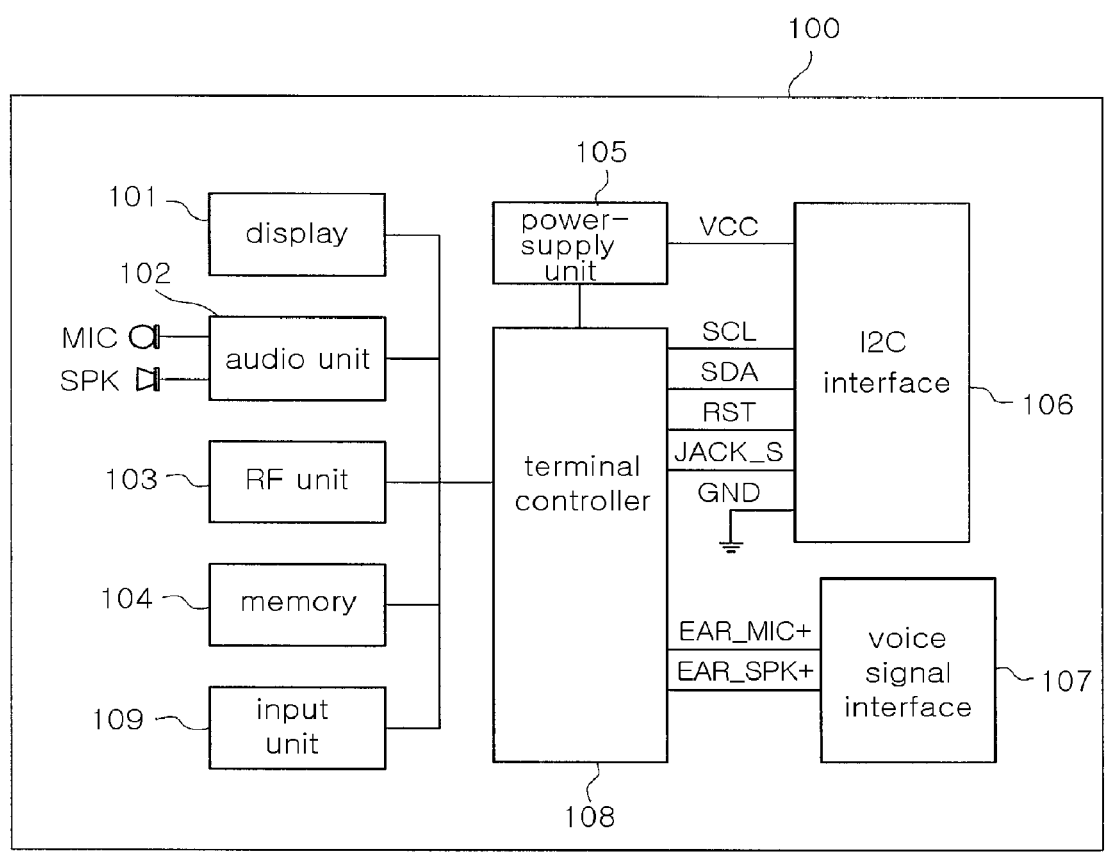

[Fig. 3]
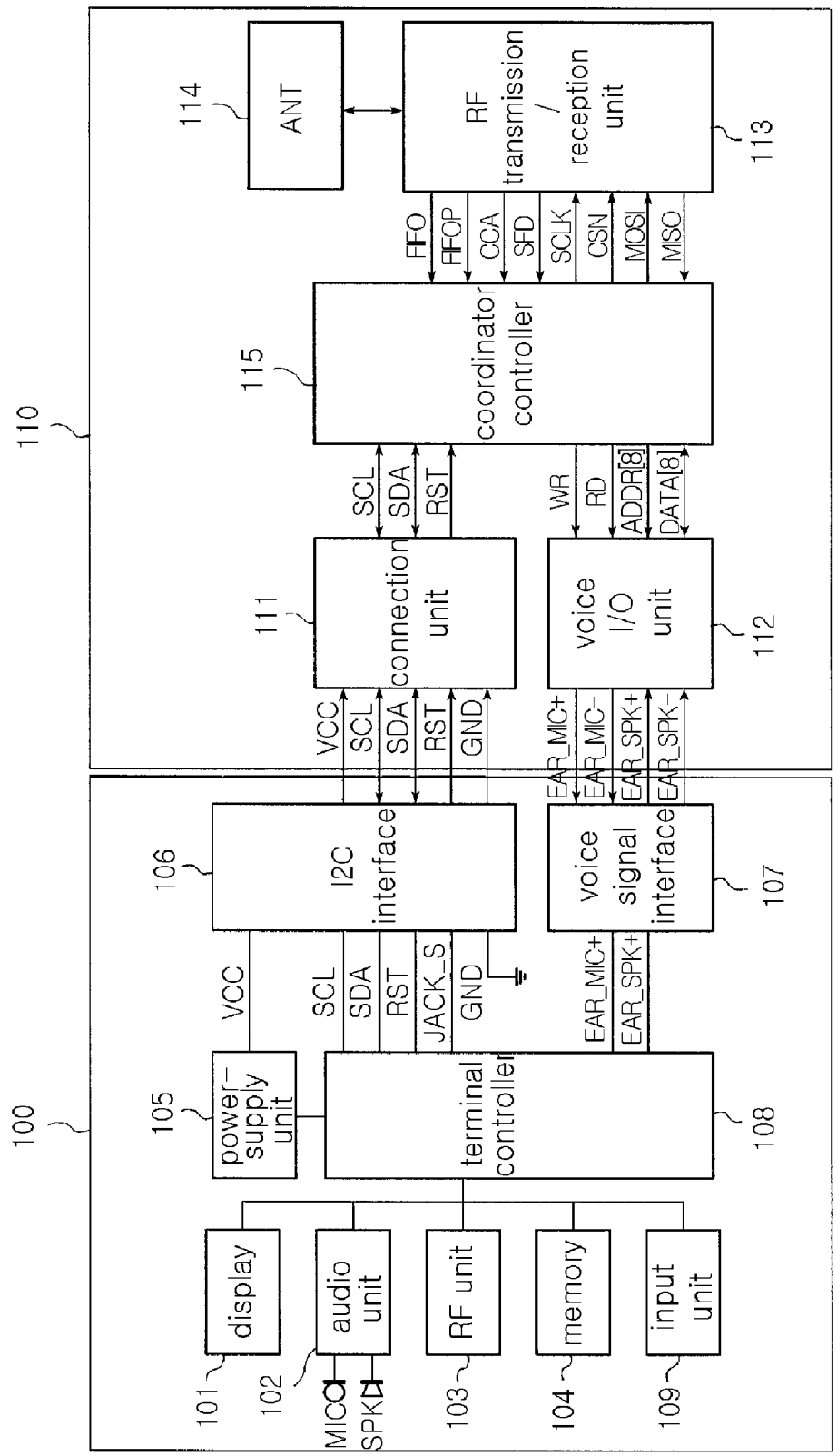

[Fig. 4]
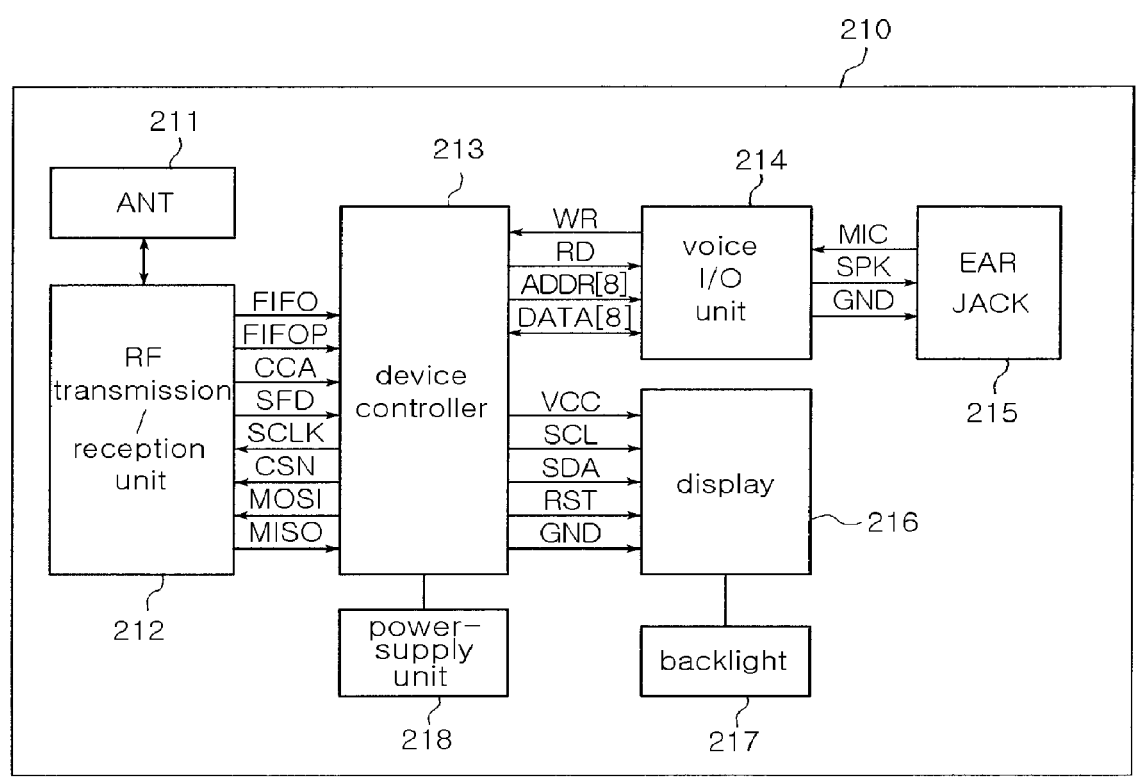

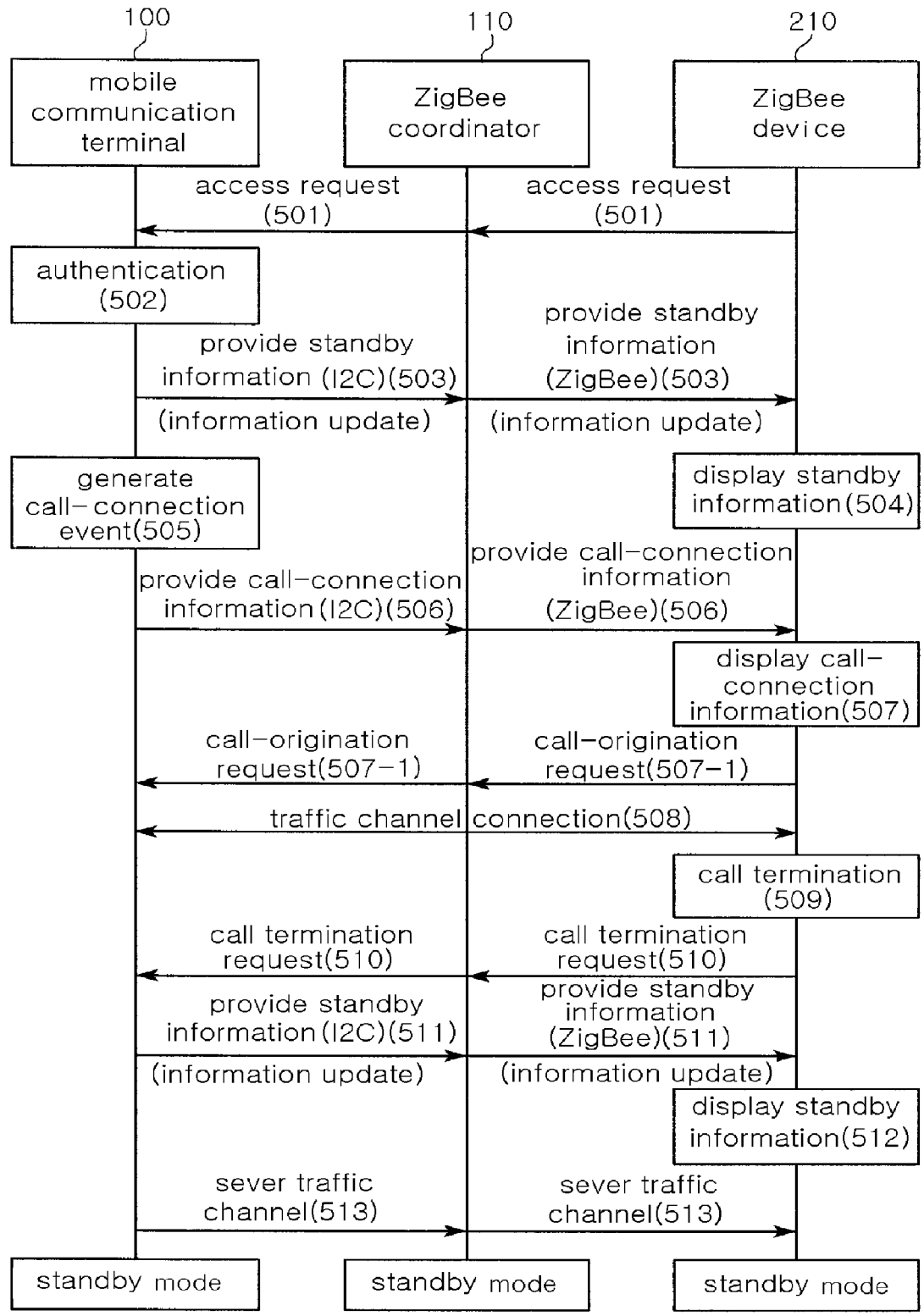
[Fig. 5]

APPARATUS AND METHOD FOR PROVIDING HANDS-FREE AND LCD DISPLAY FUNCTION OF MOBILE COMMUNICATION TERMINAL USING ZIGBEE

CROSS REFERENCE TO RELATED APPLICATION

This application is the National Phase application of International Application No. PCT/KR2005/003752, filed Nov. 8, 2005, which designates the United States and was published in English. This application, in its entirety, is incorporated herein by reference.

TECHNICAL FIELD

The present application is based on, and claims priority from, Korean Application Number 2005-0057090, filed Jun. 29, 2005, the disclosure of which are incorporated by reference herein in its entirety.

The present invention relates to a hands-free apparatus for use in a mobile communication terminal, and more particularly to an apparatus and method for providing a hands-free function of a mobile communication terminal using an IEEE 802.15.4 protocol (also called ZigBee) indicative of Wireless Personal Area Network communication scheme.

BACKGROUND ART

Typically, a Personal Area Network (PAN) is a small-sized network, the size of which is smaller than that of a LAN, and is generally indicative of intercommunication between information communication devices located in a personal area having a predetermined diameter of about 10 m. If a wireless communication scheme is applied to the above-mentioned PAN, a Wireless Personal Area Network (WPAN) is provided. The IEEE 802.15 Working Group is indicative of a short-distance wireless network standard, and prescribes the following four task groups under the WPAN. The four task groups are composed of the IEEE 802.15.1 standard indicative of a Bluetooth standard, the IEEE 802.15.3 standard, the IEEE 802.15.3a standard, and the IEEE 802.15.4 indicative of ZigBee. In this case, the IEEE 802.15.3 standard and the IEEE 802.15.3a standard relate to a high Rate WPAN.

The Bluetooth standard employs an Industrial, Scientific, and Medical (ISM) band of 2.4 GHz, performs networking via multiple access among a plurality of Bluetooth devices, and provides performance of a communication distance of 10 m and a communication speed of 1 Mbps. Therefore, a mobile phone hands-free apparatus based on the above-mentioned Bluetooth standard has already been made commercially available and placed on the market. If a user employs the above-mentioned mobile phone hands-free apparatus based on the Bluetooth standard, the user can conveniently make a phone call with a desired called party even when the user has difficulty in using a mobile phone, for example, when the user drives a vehicle or performs a specific task. Also, if the user employs the above-mentioned mobile phone hands-free apparatus the user can conveniently make a phone call with a desired called party even when the user puts the mobile phone in a bag, a handbag, or a pouch, etc. However, the above-mentioned Bluetooth scheme has been prescribed to perform a variety of complicated functions, such that it causes complicated signal processing and hardware configuration, and increases power consumption, resulting in an increased rate of replacement of a mobile phone battery.

DISCLOSURE OF INVENTION

Technical Problem

Therefore, the present invention has been made in view of the above problems, and it is an object of the present invention to provide an apparatus and method for controlling a mobile communication terminal to consume low power using a ZigBee application solution, simultaneously with easily providing a user with a hands-free function.

Technical Solution

In accordance with one aspect of the present invention, the above and other objects can be accomplished by the provision of a hands-free function provision apparatus for use in a mobile communication terminal using a ZigBee protocol, comprising: a mobile communication terminal for performing transmission/reception of a voice signal via a base station; a ZigBee coordinator for transmitting or receiving a predetermined display signal and a call control signal for establishing a call connection state to/from the mobile communication terminal, modulating or demodulating the predetermined display signal, the call control signal, and the voice signal using the ZigBee protocol, and performing wireless transmission/reception of the modulated or demodulated signals; and a ZigBee device for performing wireless transmission/reception with the ZigBee coordinator by modulating or demodulating the predetermined display signal, the call control signal, and the voice signal using the ZigBee protocol, and visually providing the predetermined display signal.

In accordance with another aspect of the present invention, there is provided a mobile communication terminal comprising: a voice signal interface for transmitting/receiving a voice signal to/from a ZigBee coordinator assigned to a ZigBee device, which has an identification (ID) number equal to that of the mobile communication terminal and is spaced apart from the mobile communication terminal by a short distance, and providing the ZigBee device with the hands-free function; a serial bus interface for transmitting or receiving the predetermined display signal and the call control signal to/from the ZigBee coordinator a power-supply unit for providing the ZigBee coordinator with a power-supply signal via the serial bus interface; and a controller for authenticating the ZigBee device by determining whether the ID number of the mobile communication terminal coincides with that of the ZigBee device, and controlling the predetermined display signal and the voice signal to be transmitted or received to/from the ZigBee device via the ZigBee coordinator.

In accordance with yet another aspect of the present invention, there is provided a ZigBee coordinator comprising: a connection unit for transmitting or receiving a predetermined display signal and a call control signal for establishing a call connection state to/from a mobile communication terminal, which has a voice communication function and maintains the same identification(ID) number; a voice Input/Output (I/O) unit for transmitting or receiving a voice signal to/from the mobile communication terminal a Radio Frequency (RF) transmission/reception unit for modulating or demodulating the predetermined display signal, the call control signal, and the voice signal, such that the modulated or demodulated signals are wirelessly communicated between the ZigBee coordinator and a ZigBee device, which has the same ID number as that of the mobile communication terminal and is spaced apart from the ZigBee coordinator by a short distance, using a ZigBee protocol; and a coordinator controller for controlling input and output operations of the display signal, the call control signal, and the voice signal.

In accordance with yet another aspect of the present invention, there is provided a ZigBee device comprising: a Radio Frequency (RF) transmission/reception unit for modulating or demodulating a predetermined display signal, a call control signal, and a voice signal, such that the modulated or demodulated signals are wirelessly communicated between the RF transmission/reception unit and a ZigBee coordinator connected to a mobile communication terminal, which has a voice communication function and maintains the same identification (ID) number, using a ZigBee protocol; a voice Input/Output (I/O) unit for transmitting a voice signal received from the ZigBee coordinator via an earphone, and receiving a voice signal from a microphone; a display for visually displaying the predetermined display signal; and a device controller for controlling input and output operations of the predetermined display signal, the call control signal, and the voice signal.

In accordance with yet another aspect of the present invention, there is provided a hands-free function provision method for use in a mobile communication terminal using a ZigBee protocol, comprising the steps of: a) allowing a ZigBee device to transmit an access request signal to the mobile communication terminal having the same identification (ID) number using the ZigBee protocol; b) authenticating whether the ZigBee device has the same ID number as that of the mobile communication terminal c) if the ZigBee device is authenticated, receiving a display signal for providing standby information via a serial bus interface, and wirelessly transmitting the received display signal to the ZigBee device using the ZigBee protocol; d) if a call connection event occurs, receiving a display signal for providing call connection information via the serial bus interface, and wirelessly transmitting the received display signal to the ZigBee device; and e) if a call-origination request signal is received from the ZigBee device, establishing a traffic channel between the mobile communication terminal and the ZigBee device.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a configuration diagram illustrating an apparatus for providing a hands-free function using ZigBee in accordance with a preferred embodiment of the present invention FIG. 2 is a block diagram illustrating a mobile communication terminal in accordance with a preferred embodiment of the present invention FIG. 3 is a block diagram illustrating a ZigBee coordinator, interfaced with a mobile communication terminal, in accordance with a preferred embodiment of the present invention FIG. 4 is a block diagram illustrating a ZigBee device in accordance with a preferred embodiment of the present invention and FIG. 5 is a flow chart illustrating a method for providing a hands-free function of a mobile communication terminal using ZigBee in accordance with a preferred embodiment of the present invention.

BEST MODE FOR CARRYING OUT THE INVENTION

Now, preferred embodiments of the present invention will be described in detail with reference to the annexed drawings.

In the drawings, the same or similar elements are denoted by the same reference numerals even though they are depicted in different drawings. In the following description, a detailed description of known functions and configurations incorporated herein will be omitted when it may make the subject matter of the present invention rather unclear.

FIG. 1 is a configuration diagram illustrating an apparatus for providing a hands-free function using ZigBee in accordance with a preferred embodiment of the present invention.

Referring to FIG. 1, an apparatus for providing a hands-free function of a mobile communication terminal using ZigBee according to the present invention includes a mobile communication terminal 100, a ZigBee coordinator 110, and a ZigBee device 210.

The mobile communication terminal 100 is connected to the ZigBee coordinator 110 via a serial bus interface, such that a predetermined display signal and a call control signal for establishing a call connection state are communicated between the mobile communication terminal 100 and the ZigBee coordinator 110. An Inter-Integrated Circuit (I2C) interface may be used as the serial bus interface in accordance with a preferred embodiment of the present invention. In this case, the I2C is an acronym for a standard Inter-Integrated Circuit bus. The above-mentioned I2C interface has a narrow bandwidth, and is indicative of a protocol applied to a circuit located at a short distance in the same manner as in an on-board circuit. The I2C interface includes a built-in addressing scheme, and can be linked to a plurality of devices. In addition, the I2C interface technically supports peer-to-peer communication instead of multi-peer communication. 8-bit bidirectional communication can be implemented under a variety of modes, for example, a standard mode of 100 kbps, a fast mode of 400 kbps, and a super-high speed of 3.4 Mbps, has very strong resistance to noise, has high reliability, is properly operated under a variety of temperature environments, and uses a small amount of power, such that it is very suitable for a mobile communication terminal 110 such as a Personal Digital Assistant (PDA). Also, the present invention may use a Universal Serial Bus (USB) as the serial bus interface. The USB is indicative of a universal bus standard for providing a user with a Computer Telephony Integration (CTI) capable of integrating a computer and a telephone in a single module. Two modes are present in the USB 1.1 specification, i.e., a low-speed mode of 1.5 Mbps and a full-speed mode of 12 Mbps. The USB 2.0 specification further includes a high-speed mode of 480 Mbps in addition to the above-mentioned two modes. A preferred embodiment in which the I2C interface is used as the serial bus interface between the mobile communication terminal 100 and the ZigBee coordinator 110 will hereinafter be explained in the following description, but it should be noted that another preferred embodiment in which the USB interface is used as the serial bus interface also falls under the scope and spirit of the present invention. Also, the mobile communication terminal 100 may be connected to the ZigBee coordinator 110 via a parallel interface or one of a variety of wired/wireless interfaces.

The ZigBee coordinator 110 and the ZigBee device 210 transmit or receive radio frequency (RF) signals using a ZigBee protocol (i.e., the IEEE 802.15.4 protocol). The IEEE 802.15.4 protocol indicative of the ZigBee protocol has a low-rate characteristic in which a raw data rate of 20 kb/s is established under a predetermined band of 816 MHz, a raw data rate of 40 kb/s is established under a predetermined band of 915 MHz, and a raw data rate of 250 kb/s is established under a predetermined band of 2.4 GHz. Therefore, the ZigBee protocol is suitable for a home network such as a sensor network. Although the ZigBee protocol serving as the WPAN standard employs a frequency area equal to that of Bluetooth communication, it has the above-mentioned low-rate characteristic, differently from the Bluetooth communication capable of a specific rate of 1 Mbps or over. The ZigBee protocol has a simple protocol stack, and has a low-priced chip cheaper than a Bluetooth chip, such that it consumes a very small amount of power. The ZigBee protocol has a bandwidth narrower than that of the Bluetooth communication having a data rate of 1 Mbps. However, since a voice communication service has a maximum data rate of 64 Kbps, the ZigBee standard of 2.4 GHz~2.483 GHz uses 16 channels of 250 kbps according to a CSMA/CA scheme, such that the voice communication service is superior to the Bluetooth communication service.

The present invention applies a ZigBee solution for short-distance communication to the mobile communication terminal 100 to provide the mobile communication terminal 100 with a hands-free function, such that a voice signal can be transmitted to the mobile communication terminal 110, and a display signal can be transmitted to the same via a serial bus interface.

The mobile communication terminal 100 performs transmission/reception of voice signals and a variety of data units using a base station (not shown), and transmits the received signals to the ZigBee device 210 via the ZigBee coordinator 110. The mobile communication terminal 100 transmits a variety of display information to the ZigBee device 210, for example, propagation intensity information, message arrival notification information, vibration mode information, battery lifetime information, time information (e.g., date, hour, and year, etc.), and caller information (e.g., a caller phone number, and a caller name, etc.), such that a user who carries the ZigBee interface 210 can easily establish a call connection state, and can employ a variety of information associated with the mobile communication terminal 100.

The ZigBee coordinator 110 transmits or receives a predetermined display signal and a call control signal for establishing a call connection state to/from the mobile communication terminal 100 via the serial bus interface. The call control signal includes an access request signal for authenticating the ZigBee device 210, a call-origination request signal, a call-connection request signal, and a connection termination signal, etc. As shown in FIG. 1, the ZigBee coordinator 110 includes a pin-type connector 120 having a plurality of connection pins to interface with the mobile communication terminal 100, and a fixing part 130 fixed to an external case of the mobile communication terminal via air compression, such that it can be detachably connected to the ZigBee coordinator 110. The ZigBee coordinator 110 may be built into the mobile communication terminal 100 as necessary. The ZigBee coordinator 110 modulates a display signal, a call control signal, and a voice signal received from the mobile communication terminal 100 using I2C or other serial protocol, and transmits the modulated signals to the ZigBee device 210 using the ZigBee protocol. Also, the ZigBee coordinator 110 demodulates the voice signal and the call control signal wirelessly received from the ZigBee device 210 using the ZigBee protocol, and transmits the demodulated signals to the mobile communication terminal 100 using I2C or other serial protocol.

The ZigBee device 210 demodulates signals wirelessly received from the ZigBee coordinator 110 using the ZigBee protocol to recover the display signal, the voice signal, and the call control signal. The ZigBee device 210 visually displays the display signal on a display 216 such as a Liquid Crystal Display (LCD). Also, the ZigBee device 210 includes a back-light button 220 for activating an illumination function to allow a user to easily recognize display information displayed on the display 216, and a function selection key 221 for selecting a variety of functions such as a call function and a volume control function, etc. A microphone 250 and an earphone 250 are connected to the ZigBee device 210 via a voice connection line 222. The user can select a call connection function and a call termination function using the call button 230 even when he or she does not use the mobile communication terminal 100.

The mobile communication terminal 100, the ZigBee coordinator 110, and the ZigBee device 210 have the same identification (ID) number. The mobile communication terminal 100 authenticates the ZigBee device 210 having the same ID number using the ZigBee coordinator 110, and transmits or receives display and voice signals to/from the ZigBee device 210, resulting in the prevention of a call contact (also called a call cross) and eavesdroping (also called wiretapping) generable among the ZigBee device 210 and other ZigBee devices. Preferably, the ID number may be formed by combining an Electronic Serial Number (ESN) of the mobile communication terminal 100 and a Media Access Control (MAC) address indicative of unique physical addresses of the ZigBee coordinator 110 and the ZigBee device 210. In this case, a pair of the ZigBee coordinator 110 and the ZigBee device 210 is configured to have the same MAC address, such that the ZigBee device 210 assigned to the ZigBee coordinate 110 can be identified.

FIG. 2 is a block diagram illustrating a mobile communication terminal in accordance with a preferred embodiment of the present invention.

Referring to FIG. 2, the mobile communication terminal 100 according to the present invention includes a display 101, an audio unit 102, an RF unit 103, a memory 104, a power-supply unit 105, an I2C interface 106, a voice signal interface 107, a terminal controller 108, and an input unit 109. The mobile communication terminal 100 includes all kinds of hand-held mobile communication terminals such as a mobile phone, a PDA, and an MP3 player, etc.

The display 101 displays numbers, characters, and graphics (or pictures) capable of providing the user with call connection state information and other information.

The audio unit 102 converts an analog voice signal received from a microphone (MIC) into a digital voice signal upon receiving a control signal from a terminal controller 108. The audio unit 102 converts the digital voice signal received from the RF unit 103 into the analog voice signal, and outputs the analog voice signal via a speaker (SPK).

The RF unit 103 modulates or demodulates data and voice signals communicated between the mobile communication terminal 100 and the base station (not shown), such that the modulated or demodulated signals can be wirelessly communicated between the mobile communication terminal 100 and the base station (not shown).

The memory 104 stores a program for controlling overall operations of the mobile communication terminal 100, an ESN indicative of a unique number of the mobile communication terminal 100, and a unique ID number formed by combining the ESN and a MAC address indicative of unique physical addresses of the ZigBee coordinator 110 and the ZigBee device 210.

The power-supply unit 105 is connected to the terminal controller 108, such that it provides a power-supply signal for operating the mobile communication terminal 100. Also, the power-supply unit 105 provides the ZigBee coordinator 110 with the power-supply signal via the I2C interface 106.

The I2C interface 106 is indicative of an interface for allowing a display signal and a call control signal other than a voice signal to be communicated between the mobile communication terminal 100 and the ZigBee coordinator 110.

The I2C interface 106 connects a clock line (SCL), a data line (SDA), and a reset line (RESET) to the terminal controller 108 to allow the display signal and the call control signal to be communicated between the mobile communication terminal 100 and the ZigBee coordinator 110. The I2C interface 106 connects a power-supply line (VCC) to the power-supply unit 102 to provide the ZigBee coordinator with a power-supply signal, and includes a ground (GND) line for grounding. The I2C interface 106 may be further connected to a jack line (JACK_S), via which the terminal controller 108 can determine the connection or disconnection state of the ZigBee coordinator 110.

The voice signal interface 107 is indicative of an interface for allowing the voice signal to be communicated between the mobile communication terminal 100 and the ZigBee coordinator 110. The voice signal interface 107 connects a microphone line (EAR_MIC) for receiving a microphone voice signal and a speaker line (EAR_SPK) for transmitting a speaker voice signal to the terminal controller 108. The above-mentioned configuration of the microphone line (EAR_MIC) and the speaker line (EAR_SPK) shows an example of the ZigBee device 210 having a mono function, and may be differently designed according to a single or dual function.

The terminal controller 108 controls overall operations of the mobile communication terminal 100. The terminal controller 108 authenticates the ZigBee device 210 by determining whether the ID number of the mobile communication terminal-coincides with that of the ZigBee device 210, and transmits or receives a voice signal and a display signal to/from the ZigBee device 200 via the ZigBee coordinator 110. If the mobile communication terminal 100 is powered on to perform booting, the terminal controller 108 initializes the ZigBee coordinator 110 and the ZigBee device 210 using the I2C interface 106, and controls the ZigBee device 210 to enter an enable state. The mobile communication terminal 100 transmits a variety of display signals to the ZigBee device 210, for example, RF signal intensity information, message arrival notification information, vibration mode display information, battery lifetime display information, and time information (e.g., hour, date, day, and year, etc.), and displays the transmitted signals on the ZigBee device 210 via the I2C interface 106.

The input unit 109 includes a plurality of key buttons, for example, number buttons, character (letter) buttons, and function buttons, etc., and receives character- or number-signals or function selection signals capable of activating a variety of mobile communication services. A user may change a unique ID number, which is shared among the mobile communication terminal 100, the ZigBee coordinator 110, and the ZigBee device 210 using the input unit 109, to another ID number. In other words, an original unique number can be visually displayed on the display 101 using a signal received in the input unit 109 from the user. A new unique number entered by the user is visually displayed on the display 101, such that the user can recognize whether a previous unique number has been normally changed to the new unique number. The new unique number is transmitted to the ZigBee coordinator 110 and the ZigBee device 210, and the previous unique number is replaced with the new unique number in such a way that the previous unique number can be changed to the new unique number.

FIG. 3 is a block diagram illustrating a ZigBee coordinator in accordance with a preferred embodiment of the present invention.

Referring to FIG. 3, the ZigBee coordinator 110 according to the present invention includes a connection unit 111, a voice Input/Output (I/O) unit 112, an RF transmission/reception unit 113, an antenna (ANT) 114, and a coordinator controller 115.

The connection unit 111 is connected to the I2C interface 106 of the mobile communication terminal 100 via the power-supply line (VCC), the clock line (SCL), the data line (SDA), the reset line (RST), and the ground (GND) line, such that it receives a predetermined display signal and a call control signal for establishing a call connection state from the mobile communication terminal 100.

The power-supply line (VCC) is adapted to transmit a power-supply signal from the mobile communication terminal 100 to the ZigBee coordinator 110. The clock line (SCL) performs transmission/reception of the I2C serial clock signal, the SDA (Data Line) display signal, and the call connection control signal. The reset line (RST) transmits a reset signal, and the GND line is operated as a ground line.

The connection unit 111 is connected to the coordinator controller 115 via a clock line (SCL), a data line (SDA), and a reset line (RST), transmits an I2C serial clock signal to the coordinator controller 115 via the clock line (SCL), transmits display data to the coordinator controller 115 via the data line (SDA), and transmits a reset signal to the coordinator controller 115 via the reset line (RST).

The voice I/O unit 112 is connected to the voice signal interface 107 of the mobile communication terminal 100 via a variety of balance output lines, i.e., a microphone-UP line (EAR_MIC+), a microphone-DOWN line (EAR_MIC−), a speaker-UP line (EAR_SPK+), and a speaker-DOWN line (EAR_SPK−), such that it transmits or receives voice signals to/from the mobile communication terminal 100 via the above-mentioned lines. The voice I/O unit 112 is connected to the coordinator controller 115 via an 8-bit address bus (ADDR[8]), an 8-bit data bus (DATA[8]), a write (WR) line, and a read (RD) line. The voice I/O unit 112 transmits or receives voice signal to/from the coordinator controller 115 using the ADDR[8] bus and the DATA[8] bus. Also, the voice I/O unit 112 converts an analog voice signal into a digital voice signal using an internal CODEC (Coder-Decoder) function, or converts the digital voice signal into the analog voice signal.

The connection unit 111 and the voice I/O unit 112 may be configured in the form of a pin-type connector. The pin-type connection includes a plurality of connection pins for connecting the mobile communication terminal 100 to the serial bus interface. For example, the pin-type connector 120 employs a 10-pole connector composed of 10 connection pins, such that it may be detachably connected to the mobile communication terminal 100 using the 10-pole connector. In the meantime, the ZigBee coordinator 110 is built into the mobile communication terminal 100, the connection unit 111 may be directly connected to the I2C interface 106, and the voice I/O unit 112 may be directly connected to the voice signal interface 107 as necessary.

The RF transmission/reception unit 113 modulates a display signal, a call control signal, or a voice signal to be transmitted to the ZigBee interface 210 having the same ID number as the above-mentioned ZigBee coordinator 110 according to a modulation method prescribed in the ZigBee protocol, wirelessly transmits the modulated signals via the antenna 114, and demodulates signals received from the ZigBee device 210. The RF transmission/reception unit 113 transmits or receives a variety of signals to/from the coordinator controller 115, for example, a First In First Out (FIFO) signal, a First In First Out Programmable (FIFOP) signal, a Clear Channel Assessment (CCA) signal, a Start of Frame Delimiter (SFD) signal, a Serial Clock (SCLK) signal, a Chip Select Negative (CSN) signal, a Master Out Slave In (MOSI) signal, and a Master In Slave Out (MISO) signal. The FIFO signal indicates a predetermined state wherein data received in the RF transmission/reception unit 113 has been stored in an internal FIFO buffer (not shown). The FIFOP signal indicates a predetermined state wherein data of more than a threshold value predetermined by a program has been stored in the FIFO buffer (not shown) as a programmable FIFO signal. The CCA signal is a reset request signal for a currently-used channel when RF channel communication is not easy. Also, the SFD signal indicates a predetermined state wherein a header field of a valid packet has been detected from among signals received via RF channels. Substantial data, i.e., a display signal and a voice signal, is transmitted via the MISO and MOSI signals, such that signals received in the RF transmission/reception unit 113 are modulated into RF signals, and are then transmitted to the ZigBee device 210 via the antenna (ANT) 114.

The coordinator controller 115 controls input and output operations of the display signal, the call control signal, and the voice signal communicated between the mobile communication terminal 100 and the ZigBee device 210, and also controls overall operations of the ZigBee coordinator 110.

FIG. 4 is a block diagram illustrating a ZigBee device in accordance with a preferred embodiment of the present invention.

Referring to FIG. 4, the ZigBee device 210 according to the present invention includes an antenna (ANT) 211, an RF transmission/reception unit 212, a device controller 213, a voice I/O unit 214, an earphone jack (EAR JACK) 215, a display 216, a backlight 217, and a power-supply unit 218.

The antenna 211 receives the display- and voice-signals, which have been modulated by the ZigBee protocol and have been wirelessly transmitted, from the ZigBee coordinator 110 connected to the mobile communication terminal 100 via a serial bus interface, and provides the RF transmission/reception unit 212 with the received display- and voice-signals.

The RF transmission/reception unit 212 demodulates the received display- and voice-signals, and transmits the demodulated signals to the device controller 213. The RF transmission/reception unit modulates data received from the controller 213 according to a predetermined scheme prescribed in the ZigBee protocol, and transmits the modulated signals to the ZigBee coordinator 110.

The RF transmission/reception unit 212 transmits or receives a variety of signals to/from the device controller 213, for example, a FIFO signal, a FIFOP signal, a CCA signal, an SFD signal, a SCLK signal, a CSN signal, a MOSI signal, and a MISO signal.

The device controller 213 controls overall operations of the ZigBee device 210. The device controller 213 receives data demodulated by the RF transmission/reception unit, and decodes the received data using an internal CODEC (not shown), such that it divides the received data into a voice signal and a display signal. The device controller 213 transmits the voice signal to the voice I/O unit 214, and transmits the display signal to the display 216.

The voice I/O unit 214 has a Digital-to-Analog Converter (DAC) function capable of converting a received digital voice signal into an analog voice signal, and an Analog-to-Digital Converter (ADC) function capable of converting the analog voice signal into the digital voice signal.

The ear jack (EAR JACK) 215 is connected to the microphone 240 and the earphone 250 according to the present invention. A voice signal (MIC) received from the microphone 240 is transmitted to the voice I/O unit 214, and a voice signal (SPK) received from the voice I/O unit 214 is transmitted to the earphone 250. The GND line of the earphone jack 215 is connected to the voice I/O unit 214.

The display 216 is connected to the device controller 213, and receives a power-supply signal (VCC), a clock signal (SCL), a display signal (SDA), and a reset signal (RST) from the device controller 213, and is further connected to the GND line. The display unit 216 displays a received display signal on an LCD.

The backlight 217 provides an illumination function capable of allowing a user to easily identify display information visually displayed on the display 216. The backlight 217 is switched on during a predetermined time after the user clicks on the backlight button contained in the ZigBee device 210, and is automatically switched off after the lapse of a predetermined time after being switched on.

The power-supply unit 218 transmits a power-supply signal to the device controller 213.

FIG. 5 is a flow chart illustrating a method for providing a hands-free function of a mobile communication terminal using ZigBee in accordance with a preferred embodiment of the present invention.

A method for wirelessly transmitting/receiving a predetermined display signal, a call control signal, and a voice signal to/from the mobile communication terminal 100, the ZigBee coordinator 110, and the ZigBee device 210 will hereinafter be described with reference to FIG. 5. In this case, the mobile communication terminal 100 serves as a master, and the ZigBee device serves as a slave. The ZigBee coordinator 110 wirelessly communicates with the ZigBee device 210 according to the ZigBee protocol (i.e., the IEEE 802.15.4 standard). Therefore, the voice signal, the display signal, and the call control signal are wirelessly communicated between the ZigBee device 210 and the ZigBee coordinator 110. The ZigBee coordinator 110 transmits or receives the display signal and the call control signal to/from the mobile communication terminal 100 via a serial bus interface such as an I2C interface. Also, the ZigBee coordinator 110 transmits or receives the voice signal to/from the mobile communication terminal 100 via an additional voice signal interface.

Referring to FIG. 5, the ZigBee device 210 is firstly powered on, and transmits an access request signal to the mobile communication terminal 100 having the same ID number as that of the ZigBee device 210 via the ZigBee coordinator 110 at step 501. The above-mentioned access request signal is adapted to establish mutual authentication between the mobile communication terminal 100 and the ZigBee device 210. The same ID number is shared among the mobile communication terminal 100, the ZigBee coordinator 110 and the ZigBee device 210, such that it prevents the ZigBee device 210 from being mistaken for other ZigBee devices. The above-mentioned ID number may be formed by combining an ESN of the mobile communication terminal 100 and MAC addresses of the ZigBee coordinator 110 and the ZigBee device 210.

The mobile communication terminal 100 receives the above-mentioned access request signal, and performs an authentication process capable of determining whether the ZigBee device 210 has the same ID number as that of the mobile communication terminal 100 at step 502. After the authentication process has been completed at step 502, the mobile communication terminal 100 uses the ZigBee device 210 as a master, such that it can freely control the ZigBee device 210 using the ZigBee coordinator 110.

If it is authenticated that the ZigBee device 210 has the same ID number as that of the mobile communication terminal 100 at step 502, the mobile communication terminal 100 transmits a predetermined display signal having standby information to the ZigBee coordinator 110 via the I2C interface, such that the above-mentioned standby information can be displayed. The ZigBee coordinator 100 receives the above-mentioned display signal having the standby information from the mobile communication terminal 100, and wirelessly transmits the received signal to the ZigBee device 210 using the ZigBee protocol at step 503. In this case, a current state is in a standby mode, and the standby information includes antenna intensity information, battery lifetime information, and time information such as hour or date.

The ZigBee device 210 receives the display signal, and displays the above-mentioned standby information on the display 216 at step 504.

Thereafter, if a phone call is received in the mobile communication terminal 100 (i.e., if a call-connection event occurs) at step 505, a predetermined display signal having call-connection information is transmitted to the ZigBee coordinator 110 via the I2C interface, such that the above-mentioned call-connection information (e.g., a caller name, a caller phone number, and call-connection ring tones) can be displayed on the ZigBee device 210. The ZigBee coordinator 100 receives the display signal having the above-mentioned call-connection information, and wirelessly transmits the received signal to the ZigBee device 210 using the ZigBee protocol at step 506.

The ZigBee device 210 receives the display signal, and displays the above-mentioned call-connection information on the display 216 at step 507.

If a call-connection user (i.e., a called user) recognizes the displayed call-connection information, and requests a call start command for establishing a call connection state with a caller user, the ZigBee device 210 transmits the above-mentioned call start request signal to the mobile communication terminal 100 via the ZigBee coordinator 110 at step 507-1, and a traffic channel is established between the mobile communication terminal 100 and the ZigBee device 210, resulting in the implementation of voice communication at step 508.

Thereafter, provided that the call connection state is terminated between the caller user and the called user, and a call termination signal is received in the ZigBee device 210 at step 509, the ZigBee device 210 transmits a call termination request signal to the mobile communication terminal 100 via the ZigBee coordinator 110 at step 510.

The mobile communication terminal 100 receives the call termination request signal, such that it recognizes that the call connection state between the caller user and the called user has been terminated. And, the mobile communication terminal 100 transmits a predetermined display signal having the standby information to the ZigBee coordinator 110 via the I2C interface, such that the standby information can be displayed. The ZigBee coordinator 100 receives the display signal having the standby information, and wirelessly transmits the received signal to the ZigBee device 210 using the ZigBee protocol at step 511.

The ZigBee device 210 receives a display signal, and displays the standby information on the display 216 at step 512.

Thereafter, the traffic channel established among the mobile communication terminal 100, the ZigBee coordinator 110, and the ZigBee device 210 is severed at step 513, and then the mobile communication terminal 100 enters a standby mode.

According to the present invention, the above-mentioned method for providing a hands-free function of the mobile communication terminal using the ZigBee can be implemented with computer-readable codes, and the computer-readable codes can be stored in a computer-readable recording medium. The computer-readable recording medium includes all the recording devices capable of storing data readable by a computer system. There are a variety of computer-readable recording mediums, for example, a Read Only Memory (ROM), a Random Access Memory (RAM), a magnetic tape, a floppy disc, and an optical data storage unit, etc. Also, the computer-readable recording mediums can also be implemented using carrier waves. The computer-readable recording mediums are distributed to a plurality of computer systems interconnected over a network, such that computer-readable codes can be stored or executed in individual computer systems according to a distribution scheme.

INDUSTRIAL APPLICABILITY

As apparent from the above description, the present invention provides a mobile communication terminal with a hands-free function using a ZigBee application solution based on the IEEE 802.15.4 standard, such that it has the following advantages.

Firstly, the ZigBee application solution employs a half-duplex scheme, such that each of a transmission end and a reception end requires an RF module having the same frequency to perform transmission/reception of voice signals. Also, the ZigBee application solution raises switching speeds of transmission/reception ends, such that it provides a superior voice quality by which a user cannot discriminate between a voice signal of the half-duplex scheme and the other voice signal of the full-duplex scheme. Also, the ZigBee application solution based on the half-duplex scheme can provide hardware cheaper than that of the full-duplex scheme.

Secondly, since a MAC address for use in a wired/wireless LAN is adapted to the ZigBee, a call cross of an RF data signal communicating with a counterpart user can be prevented during a voice communication mode. The mobile communication terminal and a transmitter connected to the mobile communication terminal may pre-register a desired receiver. The MAC address can be easily registered or changed using a user interface for use in a mobile phone acting as the mobile communication terminal.

Thirdly, if a call standby state and a call connection event occurs, standby- and caller-information corresponding to the call standby state and the call connection event is displayed on an LCD contained in the ZigBee device, such that the user can easily establish a call connection state with a called party using only the ZigBee device without using the mobile communication terminal. Also, a backlight function is further included in the ZigBee device, such that the user can easily recognize display information even when the surrounding environment is in a very dark state.

Fourth, a serial bus interface such as an I2C interface or a USB interface is arranged between the mobile communication terminal and the ZigBee coordinator, such that there is no need for the ZigBee coordinator to use an additional controller, resulting in the implementation of simplified hardware and small-sized hardware, and the increase in cost competitiveness of a product.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A hands-free function provision apparatus comprising:
a mobile communication terminal for performing transmission/reception of a voice signal via a base station;
a ZigBee coordinator for transmitting or receiving a predetermined display signal and a call control signal for establishing a call connection state to/from the mobile communication terminal, modulating or demodulating the predetermined display signal, the call control signal, and the voice signal using a ZigBee protocol, and performing wireless transmission/reception of the modulated or demodulated signals, wherein the mobile communication terminal is connected to the ZigBee coordinator via a serial bus interface, such that the predetermined display signal and the call control signal are communicated between the mobile communication terminal and the ZigBee coordinator via the serial bus interface; and
a ZigBee device for performing wireless transmission/reception with the ZigBee coordinator by modulating or demodulating the predetermined display signal, the call control signal, and the voice signal using the ZigBee protocol, and visually providing the predetermined display signal.

2. The hands-free function provision apparatus as set forth in claim 1, wherein the mobile communication terminal includes:
a voice signal interface for transmitting/receiving the voice signal to/from the ZigBee coordinator assigned to the ZigBee device, which has an identification (ID) number equal to that of the mobile communication terminal and is spaced apart from the mobile communication terminal by a short distance, and providing the ZigBee device with the hands-free function;
the serial bus interface for transmitting or receiving the predetermined display signal and the call control signal to/from the ZigBee coordinator;
a power-supply unit for providing the ZigBee coordinator with a power-supply signal via the serial bus interface; and
a controller for authenticating the ZigBee device by determining whether the ID number of the mobile communication terminal coincides with that of the ZigBee device, and controlling the predetermined display signal and the voice signal to be transmitted or received to/from the ZigBee device via the ZigBee coordinator.

3. The hands-free function provision apparatus as set forth in claim 1, wherein the ZigBee coordinator includes:
a connection unit for transmitting or receiving the predetermined display signal and the call control signal to/from the mobile communication terminal;
a voice Input/Output (I/O) unit for transmitting or receiving the voice signal to/from the mobile communication terminal;
a Radio Frequency (RF) transmission/reception unit for modulating or demodulating the predetermined display signal, the call control signal, and the voice signal, such that the modulated or demodulated signals are wirelessly communicated between the ZigBee coordinator and the ZigBee device, which has the same ID number as that of the ZigBee coordinator and is spaced apart from the ZigBee coordinator by a short distance, using the ZigBee protocol; and
a coordinator controller for controlling input and output operations of the predetermined display signal, the call control signal, and the voice signal.

4. The hands-free function provision apparatus as set forth in claim 1, wherein the ZigBee device includes:
a Radio Frequency (RF) transmission/reception unit for modulating or demodulating the predetermined display signal, the call control signal, and the voice signal, such that the modulated or demodulated signals can be wirelessly communicated between the ZigBee device and the ZigBee coordinator using the ZigBee protocol;
a voice Input/Output (I/O) unit for providing the voice signal received from the ZigBee coordinator via an earphone, and receiving a voice signal from a microphone;
a display for visually displaying the predetermined display signal; and
a device controller for controlling input and output operations of the predetermined display signal, the call control signal, and the voice signal.

5. A mobile communication terminal comprising:
a voice signal interface for transmitting/receiving a voice signal to/from a ZigBee coordinator assigned to a ZigBee device, which has an identification (ID) number equal to that of the mobile communication terminal and is spaced apart from the mobile communication terminal by a short distance, and providing the ZigBee device with the hands-free function;
a serial bus interface for transmitting or receiving the predetermined display signal and the call control signal to/from the ZigBee coordinator;
a power-supply unit for providing the ZigBee coordinator with a power-supply signal via the serial bus interface; and
a controller for authenticating the ZigBee device by determining whether the ID number of the mobile communication terminal coincides with that of the ZigBee device, and controlling the predetermined display signal and the voice signal to be transmitted or received to/from the ZigBee device via the ZigBee coordinator.

6. The mobile communication terminal as set forth in claim 5, further comprising:
an input unit including a plurality of key buttons, and receiving a change signal for changing the ID number; and
a display for visually displaying a first ID number prior to the ID number changing operation and a second ID number after the ID number changing operation.

7. A ZigBee coordinator comprising:
a connection unit for transmitting or receiving a predetermined display signal and a call control signal for establishing a call connection state to/from a mobile communication terminal, which has a voice communication function and maintains the same identification(ID) number, wherein the connection unit is connected to the mobile communication terminal via a serial bus interface;
a voice Input/Output (I/O) unit for transmitting or receiving a voice signal to/from the mobile communication terminal;
a Radio Frequency (RF) transmission/reception unit for modulating or demodulating the predetermined display signal, the call control signal, and the voice signal, such that the modulated or demodulated signals are wirelessly communicated between the ZigBee coordinator and a ZigBee device, which has the same ID number as that of the mobile communication terminal and is spaced apart from the ZigBee coordinator by a short distance, using a ZigBee protocol; and a coordinator controller for controlling input and output operations of the display signal, the call control signal, and the voice signal.

8. The ZigBee coordinator as set forth in claim 7, wherein the serial bus interface is an Inter-Integrated Circuit (I2C) interface.

9. The ZigBee coordinator as set forth in claim 7, wherein the serial bus interface is a Universal Serial Bus (USB) interface.

10. The ZigBee coordinator as set forth in claim 7, wherein each of the connection unit and the voice I/O unit are configured in the form of a pin-type connector including a plurality of connection pins, such that the connection units and the voice I/O unit are connected to the mobile communication terminal via the serial bus interface.

11. The ZigBee coordinator as set forth in claim 7, further comprising:
a fixing unit fixed to an external case of the mobile communication terminal via air compression.

12. The ZigBee coordinator as set forth in claim 7, wherein the ID number is formed by combining an Electronic Serial Number (ESN) of the mobile communication terminal and Media Access Control (MAC) addresses of the ZigBee coordinator and the ZigBee device.

13. A ZigBee device comprising:
a Radio Frequency (RF) transmission/reception unit for modulating or demodulating a predetermined display signal, a call control signal, and a voice signal, such that the modulated or demodulated signals are wirelessly communicated between the RF transmission/reception unit and a ZigBee coordinator connected to a mobile communication terminal, which has a voice communication function and maintains the same identification (ID) number, using a ZigBee protocol, wherein the mobile communication terminal is connected to the ZigBee coordinator via a serial bus interface, such that the predetermined display signal and the call control signal are communicated between the mobile communication terminal and the ZigBee coordinator via the serial bus interface;
a voice Input/Output (I/O) unit for transmitting a voice signal received from the ZigBee coordinator via an earphone, and receiving a voice signal from a microphone;
a display for visually displaying the predetermined display signal; and
a device controller for controlling input and output operations of the predetermined display signal, the call control signal, and the voice signal.

14. The ZigBee device as set forth in claim 13, further comprising:
a backlight for providing an illumination function capable of allowing a user to easily identifying display information displayed on the display.

15. The ZigBee device as set forth in claim 13, wherein the predetermined display signal includes propagation intensity information, message arrival notification information, vibration mode information, battery lifetime information, time information, and caller information.

16. The ZigBee device as set forth in claim 13, wherein the call control signal includes an access request signal for authenticating the ZigBee device, a call-origination request signal, a call-connection request signal, and a connection termination signal.

17. A hands-free function provision method comprising the steps of:
a) allowing a ZigBee device to transmit an access request signal to a mobile communication terminal having the same identification (ID) number using a ZigBee protocol;
b) authenticating whether the ZigBee device has the same ID number as that of the mobile communication terminal;
c) if the ZigBee device is authenticated, receiving a display signal for providing standby information via a serial bus interface, and wirelessly transmitting the received display signal to the ZigBee device using the ZigBee protocol;
d) if a call connection event occurs, receiving a display signal for providing call connection information via the serial bus interface, and wirelessly transmitting the received display signal to the ZigBee device; and
e) if a call-origination request signal is received from the ZigBee device, establishing a traffic channel between the mobile communication terminal and the ZigBee device.

18. The hands-free function provision method as set forth in claim 17, further comprising the steps of:
f) if a call-connection request signal is received from the ZigBee device, transmitting a display signal for providing standby state information to the ZigBee device; and
g) severing the traffic channel.

* * * * *